United States Patent Office 3,222,383
Patented Dec. 7, 1965

3,222,383
6-TRIFLUOROMETHYL STEROIDS AND METHODS FOR THEIR PRODUCTION
Wagn Ole Godtfredsen, Copenhagen, Denmark, assignor to Løvens Kemiske Fabrik ved. A. Kongsted, Ballerup, Denmark, a firm of Denmark
No Drawing. Continuation of application Ser. No. 128,277, Mar. 6, 1961. This application May 16, 1961, Ser. No. 110,357
Claims priority, application Great Britain, Mar. 18, 1960, 9,758/60; June 8, 1960, 20,190/60, Patent 905,694
6 Claims. (Cl. 260—397.4)

This invention relates to 3-keto-$\Delta^4$-6$\alpha$-trifluoromethyl steroids and is more particularly concerned with the novel 3-keto-$\Delta^4$-6$\alpha$-trifluoromethyl steroids of the androstane series, the 19-nor-androstane series, the pregnane series, the 19-nor-pregnane series, and their 3-enol ethers. Beside the 6$\alpha$-trifluoromethyl group of the compounds of the invention may contain a variety of substituents in the other positions of the steroid ring system, for example an oxygen atom or a hydroxy group in the 11-position and a halogen atom in the 9-position. Furthermore, in the androstane series the substituent in the 17$\alpha$-position can be a methyl, ethinyl or a propenyl group, and in the 17$\beta$-position a hydroxy or an acyloxy group, or the 17-position can be occupied by an oxygen atom. In the pregnane series the substituent in the 16-position can be a hydroxy, an acyloxy or a methyl group or a halogen atom, in the 17-position a hydroxy or acylated hydroxy group, in the 20-position a hydroxy group or an oxygen atom, and in the 21-position a hydroxy or acylated hydroxy group or a fluorine or chlorine atom.

This application is a continuation of copending application Serial No. 128,277, filed March 6, 1961, for 6-Trifluoromethyl Steroids and Methods for Their Production.

The invention also relates to a process for the production of 3-keto-$\Delta^4$-6$\alpha$-trifluoromethyl steroids and their 3-enol ethers.

The process of the present invention comprises the step of reacting a 3-enol ether or a 3-cycloketal of the 3-keto-$\Delta^4$ steroid from which the desired 6$\alpha$-trifluoromethyl steroid is derived, with trifluoroiodomethane in the presence of an organic base, preferably a tertiary amine. The reaction is accelerated by irradiating the reaction mixture with ultra-violet light or by adding a catalytic amount of a peroxide, such as acetylperoxide and benzoylperoxide. When subjected to an acid hydrolysis the reaction products are transformed into the corresponding 3-keto compounds. The 3-enol ethers of the invention can be isolated in cases where the acid hydrolysis is omitted.

Among suitable starting materials can be mentioned the following derivatives of the androstanie series:

The testosterone-3-enol ethers and 3-cycloketals and the 17$\beta$-acyleates thereof;
the corresponding 19-nor-testosterone derivatives;
the 17$\alpha$-methyl-testosterone-3-enol ethers and 3-cycloketals and the 17$\beta$-acylates thereof;
the corresponding 19-nor-17$a$-methyl-testosterone derivatives;
$\Delta^4$-androstene-3,17-dione-3-enol ethers and 3-cycloketals;
19-nor-$\Delta^4$-androstene-3,17-dione-3-enol ethers and 3-cycloketals;

3-keto - $\Delta^4$ - androstene-17$\alpha$-propenyl-17$\beta$-ol-3-enol ethers and 3-cycloketals and the 17$\beta$-acylates thereof;
the corresponding 19-nor-3-keto-$\Delta^4$-androstene-17$\alpha$-propenyl-17$\beta$-ol-3-enol ethers and 3-cycloketals;
and the 17$\beta$-acylates thereof;
3-keto-$\Delta^4$-androstene-17$\alpha$-ethinyl-17$\beta$-ol-3-enol ethers and 3-cycloketals and the 17$\beta$-acylates thereof, and the corresponding 19-nor-derivatives;
3-keto-$\Delta^4$-9$\alpha$-fluoro-androstene - 11$\beta$,17$\beta$-diol-3-enol ethers and 3-cycloketals, and the 17$\beta$-acylates thereof.

Furthermore, among suitable starting materials can be mentioned the following derivatives of the pregnane series:

Progesterone-3-enol ethers and progesterone-3-ketals, such as the 3-enol ethyl ether and the 3-ethylene ketal;
17-hydroxy-progesterone-3-enol ethers and 17-acyloxy-progesterone-3-enol ethers;
11-desoxy-corticosterone-21-acetate-31-enol ethers;
17$\alpha$ - hydroxy-11-desoxy - corticosterone-21-acetate-3-enol ethers;
11-epi-cortisol-21-acylate-3-enol ethers;
cortisone-21-acylate-3-enol ethers;
cortisol- and cortisone-3,20-diethylene-ketal-21-acylates;
21-fluoro-progesterone-3-enol-ethers;
9$\alpha$-fluoro-cortisone-21-acylate-3-enol ethers;
21-chloro-progesterone-3-enol ethers;
9$\alpha$-chloro-cortisone-21-acylate-3-enol ethers;
19-nor-progesterone-3-enol ethers;
9$\alpha$-fluoro- and 9$\alpha$-chloro - 16$\alpha$ - hydroxy-cortisol-16,21-diacylate-3-enol ethers;
16$\alpha$-methyl-cortisone-21-acylate-3-enol ethers;
9$\alpha$-fluoro- and 9$\alpha$-chloro-16$\alpha$-methyl-cortisol-21-acylate-3-enol ethers.

The above mentioned starting materials and the compounds of the present invention containing hydroxy groups can be esterified to produce the corresponding acylates. This reaction can be performed under esterification conditions known in the art, for example with an acid chloride or acid anhydride in pyridine. Compounds thus produced include the 16-, the 17-, and the 21-acyloxy compounds in which the acyl radical is a radical of a hydrocarbon carboxylic acid containing from 1 to 10 carbon atoms inclusive, such as formic, acetic, propionic, butyric, isobutyric, valeric, isovaleric, trimethyl-acetic, 2-methylbutyric, 3-ethyl-butyric, hexanoic, diethyl-acetic, triethyl-acetic, succinic, heptanoic, octanoic, cyclohexyl-acetic, benzoic, mono-di- and trimethyl-benzoic, phenyl-acetic, phenyl-propionic, acrylic maleic, and vinyl-acetic acids.

The 3-enol ethers used as starting materials can be prepared from the corresponding 3-keto-$\Delta^4$ steroids by reaction with an alkyl orthoformate, especially methyl or ethyl orthoformate, in an organic solvent, such as for example dioxane, benzene, xylene or the like, in the presence of a suitable catalyst, such as a strong acid, for example p-toluenesulfonic acid.

The 3-cycloketals are prepared by reacting the corresponding 3-keto-$\Delta^4$ steroid with a glycol, especially ethylene glycol, propylene glycol or the like in the same solvents and under similar conditions as for the formation of the enol ethers, or by a transketalization process. These reactions are well known in the art of steroid chemistry.

The treatment of the 3-enol ethers and the 3-cycloketals of the 3-keto-$\Delta^4$ steroid with an excess of trifluoroiodomethane is carried out in the presence of an organic base, preferably a tertiary amine, such as for example triethylamine or pyridine. If ultra-violet light is used as initiator, the mixture is placed in a sealed quartz tube and irradiated with ultra-violet light in a period of time from 10 to 100 hrs. The reaction can be carried out at room temperature or at lower temperatures, and in order to prevent high pressure caused by heat from the lamp, it is advisable or necessary to cool the reaction vessel. If an organic peroxide is used, it is advisable to place the reaction mixture in a bomb and heat it to 40–100° C. As liquid trifluoroiodomethane in most cases readily dissolves the other reaction components, it is not necessary to use any other solvent, although in some cases it may be convenient to use an indifferent solvent such as benzene, toluene or carbon disulfide, at the same time reducing the amount of trifluoroiodomethane.

The excess of trifluoroiodomethane and the solvent, if any, being distilled off, the resulting 6$\alpha$-trifluoromethyl steroid can be further reacted without isolation under conditions reestablishing the 3-keto group. This involves a treatment of the crude product in an organic solvent such as ethanol or acetone with a dilute aqueous acid, preferably a strong mineral acid such as hydrochloric or sulphuric acid, at a temperature between room temperature and the boiling point of the solvent. The reaction conditions required for completing the hydrolysis are somewhat dependant on the particular 3-keto-$\Delta^4$-6$\alpha$-trifluoromethyl steroid intermediates. Isolation of the free 3-keto-$\Delta^4$-6$\alpha$-trifluoromethyl steroid is conveniently achieved by adding a large volume of water and filtering the precipitated product. The crude product can be purified by recrystallization or by chromatography. In cases where the starting material is a 3-enol ether, the resulting 3-keto-$\Delta^4$-6$\alpha$-trifluoromethyl-3-enol ether steroid can be isolated from the residue by omitting the acid hydrolysis.

The instant invention also relates to 3-keto-$\Delta^{1,4}$-6$\alpha$-trifluoromethyl steroids and is more particularly concerned with the novel 3-keto-$\Delta^{1,4}$-6$\alpha$-trifluoromethyl steroids of the androstane series, the 19-nor-androstane series, the pregnane series and the 19-nor-pregnane series. Besides the 6$\alpha$-trifluoromethyl group the compounds of the invention may contain a variety of substituents in the other positions of the steroid ring system, for example an oxygen atom or a hydroxy group in the 11-position and a halogen atom in the 9-position. Furthermore, in the androstane series, the substituent in the 17$\alpha$-position can be a methyl, ethinyl and a propenyl group, and in the 17$\beta$-position a hydroxy or an acyloxy group, or the 17-position can be occupied by an oxygen atom; and in the pregnane series the substituent in the 16-position can be a hydroxy, acyloxy or methyl group or a hologen atom, in the 17-position a hydroxy or acylated hydroxy group, in the 20-position a hydroxy group or an oxygen atom, and in the 21-position a hydroxy or acylated hydroxy group or a fluorine or chlorine atom.

It is another object of the present invention to provide a process for the production of the 3-keto-$\Delta^{1,4}$-6$\alpha$-trifluoromethyl steroids, which process comprises reacting a 3-enol ether of the 3-keto-$\Delta^4$ steroid from which the desired 3-keto-$\Delta^{1,4}$-6$\alpha$-trifluoromethyl steroid is derived with trifluoroiodomethane in the presence of an organic base, preferably a tertiary amine, accelerating the reaction either by irradiating the reaction mixture with ultraviolet light or by adding a catalytic amount of a peroxide, such as benzoylperoxide, as is more particularly described in the preceding, whereafter the 3-enol ether of the 3-keto-$\Delta^4$-6$\alpha$-trifluoromethyl steroid obtained is transformed into the corresponding 3-keto-1,4-dien compound by treatment with N-bromosuccinimide in aqueous buffered acetone, followed by a treatment of the resulting bromo-compound with a dehydrobrominating agent. By the reaction with N-bromosuccinimide a bromine atom is introduced in the 6-position, whereafter the dehydrobromination in still unknown manner establishes a double-bond in the 1,2-position. The treatment with N-bromosuccinimide is preferably carried out at low temperature, and the dehydrobromination is performed by dissolving the reaction product in an organic solvent containing the appropriate amount of a substance capable of binding the hydrogen bromide, such as alkali or earth alkali carbonates and collidine.

The dehydrogenation can also be performed according to known procedures for producing a $\Delta^1$-double bond, for example by treatment of the corresponding 6$\alpha$-trifluoromethyl-3-keto-$\Delta^4$ steroid, which is obtained by hydrolysis of the above-mentioned 3-enol ether, with selenium dioxide or 2,3-dichloro - 5,6 - dicyano - benzoquinone, preferably at elevated temperature.

Among suitable starting materials used in this dehydrogenation process can be mentioned the following derivatives of the androstane series:

6$\alpha$-trifluoromethyl-testosterone - 17$\beta$ - acylates, and the corresponding 19 - nor - testosterone derivatives; 6$\alpha$ - trifluoromethyl-17$\alpha$-methyl - testosterone, the 17$\beta$ - acylates thereof and the corresponding 19-nor-6$\alpha$-trifluoromethyl-17$\alpha$-methyl-testosterone derivatives; 6$\alpha$ - trifluoromethyl-$\Delta^4$-androstene-3,17-dione; 19-nor-6$\alpha$-trifluoromethyl - $\Delta^4$-androstene - 3,17 - dione; 3-keto - $\Delta^4$-6$\alpha$-trifluoromethyl-androstene-17$\alpha$-propenyl - 17$\beta$ - ol and the 17$\beta$ - acylates thereof; the corresponding 19-nor-derivatives; 3-keto-$\Delta^4$-6$\alpha$-trifluoromethyl-androstene-17$\alpha$-ethinyl-17$\beta$-ol, the 17$\beta$-acylates thereof and the corresponding 19-nor-derivatives; 3-keto-$\Delta^4$-6$\alpha$-trifluoromethyl-9$\alpha$-fluoro - androstene - 11$\beta$-17$\beta$-diol and the 17$\beta$-acylates thereof. Furthermore, among suitable starting materials can be mentioned the following derivatives of the pregnane series: 6$\alpha$-trifluoromethyl-progesterone; 6$\alpha$ - trifluoromethyl - 17 - hydroxy-progesterone and its 17-acylates; 6$\alpha$-trifluoromethyl-11-desoxycorticosterone 21-acetate; 6$\alpha$-trifluoromethyl - 17-hydroxy-11-desoxy-corticosterone 21-acetate; 6$\alpha$-trifluoromethyl-11-epi-cortisol 21 - acylates; 6$\alpha$ - trifluoromethyl-cortisone 21 - acylates; 6$\alpha$ - trifluoromethyl - 21 - fluoro-progesterone; 6$\alpha$-trifluoromethyl-9$\alpha$-fluoro-cortisone 21-acylates; 6$\alpha$-trifluoromethyl-21-chloro-progesterone; 6$\alpha$-trifluoromethyl-9$\alpha$-chloro-cortisone - 21 - acylates; 6$\alpha$ - trifluoromethyl-19-nor-progesterone; 6$\alpha$-trifluoromethyl-9$\alpha$-fluoro- and 9$\alpha$-chloro-16$\alpha$-hydroxy-cortisol-16,21-diacylates; 6$\alpha$-trifluoromethyl-16$\alpha$-methyl-cortisone 21-acylates; 6$\alpha$-trifluoromethyl-9$\alpha$-fluoro- and 9$\alpha$-chloro-16$\alpha$-methyl-cortisol 21-acylates. The preparation of these novel starting substances has been described in the foregoing.

The above mentioned starting substances and the products of the present invention containing hydroxy groups can be esterified to produce the corresponding acylates. This reaction can be performed under esterification conditions known in the art, for example with an acid chloride or acid anhydride in pyridine. Compounds thus produced include the 16-, the 17- and the 21-acyloxy compounds in which the acyl radical is a radical of a hydrocarbon carboxylic acid containing from 1 to 10 carbon atoms inclusive, such as formic, acetic, propionic, butyric, isobutyric, valeric, isovaleric, trimethyl-acetic, 2-methyl-butyric, 3-ethyl-butyric, hexanoic, diethyl-acetic, triethyl-acetic, succinic, heptanoic, octanoic, cyclo-hexyl-acetic, benzoic, mono-, di- and trimethyl-benzoic, phenyl-acetic, phenyl-propionic, acrylic, maleic and vinyl-acetic acids.

The 3-enol ethers and 3-cycloketals used can be prepared from the corresponding 3-keto-$\Delta^4$ steroids by reaction with an alkyl orthoformate or with a glycol in the manner hereinbefore described.

The present invention also relates to 3-keto-$\Delta^{4,6}$-6-trifluoromethyl and 3-keto-$\Delta^{1,4,6}$-6-trifluoromethyl steroids and is more particularly concerned with the novel 3-keto-$\Delta^{4,6}$-6-trifluoromethyl and 3-keto-$\Delta^{1,4,6}$-6-trifluoromethyl steroids of the androstane series, the 19-nor-androstane series, the pregnane series and the 19-nor-pregnane series.

Beside the 6-trifluoromethyl group the compounds of the invention may contain a variety of substituents in the other positions of the steroid molecule, for example an oxygen atom or a hydroxy group in the 11-position and a halogen atom in the 9-position. Furthermore, in the androstane series the substituent in the 17α-position can be a methyl, ethinyl or a propenyl group, and in the 17β-position a hydroxy or an acyloxy group, or the 17-position can be occupied by an oxygen atom. In the pregnane series the substituent in the 16-position can be a hydroxy, an acyloxy or a methyl group or a halogen atom, in the 17-position a hydroxy or acylated hydroxy group, in the 20-position a hydroxy group or an oxygen atom, and in the 21-position a hydroxy or acylated hydroxy group or a fluorine or chlorine atom.

The process of the present invention comprises the steps of reacting a 3-enol ether or a 3-cycloketal of the 3-keto-$\Delta^4$ steroid from which the desired 3-keto-$\Delta^{4,6}$-6-trifluoromethyl and the 3-keto-$\Delta^{1,4,6}$-6-trifluoromethyl steroids are derived, with trifluoroiodomethane in the presence of an organic base, preferably a tertiary amine while accelerating the reaction for example by irradiating the reaction mixture with ultra-violet light or by adding a peroxide, as has been more particularly described hereinbefore, whereafter, by hydrolyzation of the reaction product, the 3-keto-$\Delta^4$-6α-trifluoromethyl steroid obtained is transformed by dehydrogenation into the corresponding 4,6-dien and, if desired, to the corresponding 1,4,6-trien-compound. These dehydrogenation steps can be performed according to known procedures for producing $\Delta^1$ and $\Delta^6$-double bonds. The introduction of the $\Delta^6$ double bond can be performed by treatment of a 3-cycloketal of the 3-keto-$\Delta^4$-6α-trifluoromethyl steroid with N-bromosuccinimide in an organic solvent such as tetrachloromethane while irradiating the reaction mixture with light from a photo lamp and subsequently treating the reaction product with boiling collidine. By hydroyzation the 3-ketal group is removed, and the desired 3-keto-$\Delta^{4,6}$-6-trifluoromethyl steroid is obtained. The introduction of the $\Delta^1$-double bond may be accomplished by treating the 3-keto-$\Delta^{4,6}$-6-trifluoromethyl steroid dissolved in an organic solvent with a dehydrogenating agent such as selenium dioxide or 2,3-dichloro-5,6-dicyano-benzoquinone, preferably at elevated temperature, and at the end of the reaction removing excess of dehydrogenating agent, whereafter the resulting reaction product is recovered by conventional methods, such as precipitation, recrystallizations or chromatographic purification.

Suitable starting materials can be the 3-keto-$\Delta^4$-6α-trifluoromethyl compounds already mentioned.

The dehydrogenated compounds of the present invention containing hydroxy groups can be esterified to produce the corresponding acylates. This reaction can be performed under esterification conditions known in the art, for example with an acid chloride or -anhydride in pyridine. Compounds thus produced include the 16-, the 17-, and the 21-acyloxy compounds in which the acyl radical is a radical of a hydrocarbon carboxylic acid containing from 1 to 10 carbon atoms inclusive, such as formic, acetic, propionic, butyric, isobutyric, valeric, isovaleric, trimethyl-acetic, 2-methyl-butyric, 3-ethyl-butyric, hexanoic, diethyl-acetic, triethyl-acetic, succinic, heptanoic, octanoic, cyclohexyl-acetic, benzoic, mono-, di- and trimethyl-benzoic, phenyl-acetic, phenyl-propionic, acrylic maleic and vinyl-acetic acids.

The compounds of the present invention are capable of exerting hormonal effects in human beings, which effects are of the same kind, but usually more marked than those produced by the 6-unsubstituted 3-keto-$\Delta^4$ steroids from which they are derived. By the McPhail modification of the Clauberg test for progestational activity as described in "Methods in Medical Research," vol. 2 (1950), page 294, 6α-trifluoromethyl-17α-acetoxyprogesterone shows an activity thirty to forty times the activity of 17α-acetoxyprogesterone, and the corresponding 6α-trifluoromethyl-17α-acetoxyprogesterone-3-enol ethyl ether shows an activity fifteen to twenty times that of 17α-acetoxyprogesterone. Likewise 6α-trifluoromethyl-$\Delta^{1,4}$-pregnadiene-17α-ol-3,20-dione 17-acetate shows an activity twenty to twenty-five times that of 17α-acetoxyprogesterone, and 6-trifluoromethyl-$\Delta^{4,6}$-pregnadiene-17α-ol-3,20-dione 17-acetate shows an activity fifteen to twenty times that of 17α-acetoxyprogesterone. All the compounds were administered orally.

Undesirable side-effects such as androgenic activity, anabolic effect and estrogenic effect are not seen. Thus, the 6α-trifluoromethyl-17α-acetoxyprogesterone has an androgenic effect which is less than 1:60 of that of testosterone-propionate, and no anabolic and estrogenic effect has been found. Furthermore, in contradistinction to the analogous 6α-methylsteroids, the 6α-trifluoromethyl steroids give no rise to adrenal depression even in large doses.

The novel compounds of this invention can be prepared for human or animal use and administered in a wide variety of oral or parenteral dosage forms suitable for such use. They can be given singly or in admixture with other coacting compounds, and they can be associated with a pharmaceutical carrier which can be a solid material or a liquid in which the compound is dissolved, dispersed or suspended.

The solid compositions can be made in conventional forms such as tablets, pills and capsules or the like, preferably in unit dosage forms for simple administration. The liquid compositions can be made in form of solutions, emulsions, suspensions, syrups and the like.

For topical use the compounds can be administered in the form of ointments, creams and the like, with or without coacting constituents forming advantageous compositions therewith.

The following examples illustrate the invention, but are not to be construed as limiting the scope of the invention:

EXAMPLE 1

(a) *6α-trifluoromethylcortisone-20-ethyleneketal 21-acetate.*—A mixture of 1.0 g. of cortisone-3,20-bisethyleneketal 21-acetate, 12.0 g. of trifluoroiodomethane and 0.5 ml. of triethylamine was irradiated with ultra-violet light from a high-pressure quartz-mercury lamp (Philips type 93110 E) at a distance of 10 cm. for 100 hours in a sealed quartz-tube. Thereafter the trifluoroiodomethane was distilled off, and the residue was dissolved in benzene. Some unreacted starting material was filtered off, and the filtrate was washed with a dilute aqueous solution of NaOH and subsequently with water. After drying, the solution was evaporated to dryness in vacuo, the residue was dissolved in a mixture of 15 ml. of acetone and 2.0 ml. of 4-N aqueous sulphuric acid, and the solution was left standing at room temperature for 16 hours. Thereafter crude 6α-trifluoromethyl-cortisone-20-ethyleneketal 21-acetate was precipitated by addition of water. After washing and drying, the amount of crude product was 520 mg. After recrystallization from methanol the product had a melting point of 248–250° C. The ultra-violet spectrum showed a maximum at 233 mμ; log ε=4.18. The infra-red spectrum showed maxima at 1600, 1678, 1705, and 1744 cm.$^{-1}$ (in chloroform).

(b) *6α-trifluoromethylcortisone.*—310 mg. of 6α-trifluoromethyl-cortisone-20-ethyleneketal 21-acetate were dissolved in 50 ml. of anhydrous methanol, a solution of sodium methoxide, prepared from 23 mg. of sodium and 25 ml. of anhydrous methanol, was added, and the mixture was kept under nitrogen for 20 minutes. After the addition of 0.3 ml. of acetic acid, the solvent was distilled off in vacuo. The residue was stirred with 20 ml. of water for 30 minutes, whereafter the solids were filtered off and dissolved in a mixture of 25 ml. of methanol and 2.5 ml. of 8.5% (v./v.) aqueous sulphuric acid. The resulting solution was boiled under reflux for 45 minutes. After cooling, the solution was neutralized with sodium bicarbonate and concentrated to one fourth of its volume. 10 ml. of water were added to the concentrated solution, and the suspension thereby formed was extracted three times, each time with 5 ml. of methylene chloride, whereafter the combined extracts were dried with MgSO₄ and subsequently evaporated to dryness. The amorphous residue was 6α-trifluoromethyl-cortisone. The ultra-violet spectrum showed a maximum at 232 mμ; log ε=4.16.

(c) *6α-trifluoromethylcortisone 21-acetate.*—The amorphous 6α-trifluoromethylcortisone obtained as described under (b) was dissolved in 2.5 ml. of anhydrous pyridine, 0.5 ml. of acetic acid anhydride was added, and the solution was left standing at room temperature for 16 hours. Thereafter the mixture was poured on ice and extracted three times, each time with 5 ml. of methylene chloride. The combined extracts were washed with water, dried over MgSO₄ and subsequently evaporated to dryness in vacuo. The amorphous residue was 6α-trifluoromethylcortisone 21-acetate. By crystallization from methanol the product had M.P. 225–226° C. The ultraviolet spectrum showed a maximum at 232 mμ; log ε=4.18. The infra-red spectrum showed maxima at 1615, 1680, 1711, 1728 and 1745 cm.⁻¹ (in chloroform).

EXAMPLE 2

*6α - trifluoromethyl - 17α - acetoxyprogesterone-3-enol ethyl ether.*—A mixture of 5.00 g. of 17α-acetoxyprogesterone-3-enol ethyl ether, 2.5 ml. of anhydrous pyridine and 10 ml. of trifluoroiodomethane was irradiated with ultra-violet light from a high-pressure quartz-mercury lamp (Philips Type 93110 E) at a distance of 5 cm. during 72 hrs. in a sealed and cooled quartz tube. Thereafter the trifluoroiodomethane was distilled off and the residue was treated with 75 ml. of ether. The precipitate thereby formed was filtered off, and the filtrate was washed with 2×10 ml. of 1-N hydrochloric acid, thereafter with a saturated solution of NaHCO₃ and subsequently with water. After drying over MgSO₄, a few drops of pyridine were added, whereafter the solution was evaporated to dryness. The residue was recrystallized from methanol containing 0.5% pyridine, whereby 2.8 g. of the desired substance were obtained with M.P. 178.5–182.5° C. After two further recrystallizations from the same solvent, the M.P. was 183.5–186° C., $[\alpha]_D^{20}=-181°$ (in CHCl₃). The U.V. spectrum showed a maximum at 256–257 mμ (ε=21400).

Calculated: C, 66.65%; H, 7.53%. Found: C, 66.53%; H, 7.66%.

The starting material used can be produced in the following manner: 13.5 g. of 17α-acetoxyprogesterone and 70 mg. of p-toluenesulfonic acid were dissolved in 200 ml. of anhydrous benzene, 6.0 ml. of ethyl orthoformate (triethoxymethane) and 5.0 ml. of absolute ethanol were added, and the mixture was boiled under reflux for 3 hours. After cooling, 5 ml. of pyridine were added, whereafter the solution was evaporated to dryness. The residue was recrystallized from methanol containing 0.5% pyridine. 9.7 g. of 17α-acetoxyprogesterone-3-enol ethyl ether were thereby obtained with M.P. 159–161° C.

EXAMPLE 3

*6α-trifluoromethyl - 17α - acetoxyprogesterone.*—1.00 g. of 6 - trifluoromethyl - 17α - acetoxyprogesterone-3-enol ethyl ether was suspended in a mixture of 10 ml. of methanol and 2 ml. of 4-N hydrochloric acid, and the suspension was boiled with reflux for 1 hour. After cooling, the desired substance was precipitated by addition of water. Thereby 800 mg. of crude product were obtained. By recrystallization from methylcellosolve a product was obtained with M.P. 206–207° C. $[\alpha]_D^{20}=+30°$ (CHCl₃); U.V. max.=234 mμ(ε=15600).

EXAMPLE 4

*6α-trifluoromethyl-17α-acetoxyprogesterone.*—1.5 g. of 17α-acetoxyprogesterone-3-enol ethyl ether, 0.75 ml. of anhydrous pyridine, and 10 g. of trifluoroiodomethane were filled into a quartz-tube which, after sealing, was irradiated, while being cooled with water, with ultra-violet light from a high-pressure quartz-mercury lamp (Philips type 93110 E) from a distance of 5 cm. for a period of 48 hours. Thereafter, the trifluoroiodomethane was distilled off, and the residue was treated with 50 ml. of ether. The precipitate thereby formed was filtered off, and the filtrate was washed with dilute hydrochloric acid, subsequently with an aqueous solution of sodium thiosulphate, and finally with water. After drying over MgSO₄, the solution was evaporated in vacuo to dryness, the residue was dissolved in 10 ml. of methanol and 2 ml. of 4-N hydrochloric acid, and the solution was boiled with reflux for 30 minutes. After cooling, 50 ml. of water were added, and after stirring for a while the precipitate thereby formed was filtered off, washed with water and dried over P₂O₅ in vacuo. The dried substance was triturated with 5 ml. of methanol, whereby 750 mg. of 6α-trifluoromethyl-17α-acetoxyprogesterone were obtained in crystalline form. After repeated recrystallizations from 2-methoxyethanol the melting point of the substance was 205–207° C. The ultra-violet spectrum showed a maximum at 234 mμ; ε=15850. The infra-red spectrum showed maxima at 1055, 1087, 1108, 1132, 1170, 1257, 1268, 1370, 1405, 1620, 1685, and 1735 cm.⁻¹ (in solid KBr).

EXAMPLE 5

*6α-trifluoromethyl-testosterone.*—A solution of 5.0 g. of testosterone-3-enol ethyl ether in a mixture of 30 ml. of dry benzene, 2.5 ml. of dry pyridine and 10 g. of trifluoroiodomethane was irradiated in a quartz vessel at room temperature for 48 hours with light from a high-pressure quartz-mercury lamp (Philips type 93110 E). The precipitate, consisting of pyridine hydroiodide, was filtered off and washed with ether, whereafter the combined filtrate and ethereal phases were washed with water, dried and evaporated in vacuo to dryness. The residue was boiled with reflux for 30 minutes with a mixture of 50 ml. of methanol and 5 ml. of 4 N hydrochloric acid. After cooling, the desired substance was precipitated by addition of water. Pure 6α-trifluoromethyl-testosterone was obtained by chromatography of the dried, crude product on silica gel.

Ultraviolet absorption spectrum:

$$\lambda_{max.}^{EtOH} = 236 \ m\mu \ (\mu=15000)$$

Calculated for C₂₀H₂₇F₃O₂: C, 67.39%; H, 7.64%; F, 15.99%. Found: C, 67.23%; H, 7.72%; F, 15.71%.

Acylation of 6α-trifluoromethyl-testosterone with acetic acid anhydride in pyridine gave 6α-trifluoromethyl-testosterone acetate, M.P. 153–155° C. (from methylcyclohexane).

Calculated for C₂₂H₂₉F₃O₃: C, 66.4%; H, 7.33%; F, 14.3%. Found: C, 66.21%; H, 7.37%; F, 14.4%.

Analogously, the 17-propionate, the 17-phenylpropionate and the 17-isobutyrate were prepared by acylation of 6α-trifluoromethyl-testosterone with the appropriate acid chloride or -anhydride in pyridine.

EXAMPLES 6–13

Following the procedure described in the foregoing example and using the below mentioned starting materials, the reaction products shown in the table were obtained.

| Examples | Starting Materials | Reaction Product | M.P., °C. | U.V. Spectrum (Ethanol) | Extinction=ε |
|---|---|---|---|---|---|
| 6 | 17α-methyltestosterone-3-enol ethyl ether | 6α-trifluoromethyl-17α-methyltestosterone | Amorphous. | 236 mμ | 14800 |
| 7 | 19-nor-testosterone-3-enol ethyl ether | 6α-trifluoromethyl-19-nor-testosterone | 157–158 | 234 mμ | 15000 |
| 8 | Progesterone-3-enol ethyl ether | 6α-trifluoromethyl-progesterone | Amorphous. | 234 mμ | 15400 |
| 9 | 17α-hydroxy-11-desoxycorticosterone-3-enol ethyl ether. | 6α-trifluoromethyl-17α-hydroxy-11-desoxycorticosterone. | 205–206 | 235 mμ | 14600 |
| 10 | 11-desoxycorticosterone 21-acetate-3-enol ethyl ether. | 6α-trifluoromethyl-11-desoxycorticosterone 21-acetate. | 149–150 | 234 mμ | 16100 |
| 11 | 9α-fluoro-cortisone 21-acetate-3-enol ethyl ether. | 6α-trifluoromethyl-9α-fluoro-cortisone 21-acetate. | Amor- | 233 mμ | 16000 |
| 12 | Δ⁴-androstene-3,17-dione-3-enol ethyl ether | 6α-trifluoromethyl-Δ⁴-androstene-3,17-dione | Amorphous. | 236 mμ | 15200 |
| 13 | 19-nor-Δ⁴-androstene-3,17-dione-3-enol ethyl ether. | 6α-trifluoromethyl-19-nor-Δ⁴-androstene-3,17-dione. | 172–173 | | |

ANALYSES

| Examples | C | | H | | F | |
|---|---|---|---|---|---|---|
| | Calc. | Found | Calc. | Found | Calc. | Found |
| 6 | 68.11 | 68.18 | 7.89 | 7.72 | 15.39 | 15.53 |
| 7 | 66.65 | 66.85 | 7.36 | 7.51 | 16.65 | 16.38 |
| 8 | 69.07 | 69.18 | 7.64 | 7.68 | 14.90 | 15.17 |
| 9 | 63.77 | 63.11 | 7.05 | 7.16 | 13.76 | 13.52 |
| 10 | 65.45 | 65.21 | 7.10 | 7.12 | 12.94 | 12.78 |
| 11 | 59.00 | 59.12 | 5.78 | 5.86 | 15.55 | 15.37 |
| 12 | 67.70 | 67.75 | 7.11 | 7.17 | 16.10 | 16.21 |
| 13 | 67.04 | 67.21 | 6.81 | 6.90 | 16.74 | 16.32 |

EXAMPLE 14

6α - trifluoromethyl-Δ$^{1,4}$-pregnadiene-17α-ol-3,20-dione 17-acetate.—150 mg. of selenium dioxide were added to a solution of 300 mg. of 6α-trifluoromethyl-17α-acetoxyprogesterone prepared as described in Example 3 in 10 ml. of tertiary butanol containing 0.04 ml. of pyridine. The mixture was boiled with reflux for 18 hours and subsequently cooled and filtered through Hyflo Super-Cel to remove the selenium solids. The filtrate was evaporated to dryness and the residue triturated with water. After filtering and drying over P$_2$O$_5$ the product was dissolved in anhydrous benzene, whereupon the solution was chromatographed on a column of silica gel. The column was eluated with a mixture consisting of 9 parts of benzene and 1 part of ether, whereby 140 mg. of the desired substance were obtained. By recrystallization from acetone/hexane the substance was obtained with a M.P. of 213–215° C. [α]$_D^{20}$=−28.9° (in CHCl$_3$). The infra-red spectrum (KBr) showed maxima at 1732, 1718 (infl.), 1668, 1632, 1610, 1462, 1438, 1412, 1368, 1302, 1268, 1255 and 1172 cm.$^{-1}$. The U.V. spectrum showed a maximum at 242 mμ (ε=17350).

Calculated: C, 65.73%; H, 6.67%. Found: C, 65.48%; H, 6.58%.

EXAMPLE 15

6α - trifluoromethyl-Δ$^{1,4}$-pregnadiene-17α-ol-3,20-dione 17-acetate.—413 mg. of 6α-trifluoromethyl-17α-acetoxyprogesterone-3-enol ethyl ether were dissolved in a mixture of 12 ml. of acetone, 220 mg. of sodium acetate and 1.5 ml. of water, and the mixture was cooled to 0° C. 320 mg. of N-bromosuccinimide immediately followed by 0.25 ml. of glacial acetic acid were added, the mixture was stirred for 3 hours at 0–5° C. and thereafter poured into ice-water. After filtering, washing and drying, 428 mg. of a product with M.P. 141–142° C. were obtained. The product was dissolved in 3 ml. of dimethylformamide containing 200 mg. of calcium carbonate, and the mixture was heated to the boiling point for 45 minutes. The hot mixture was filtered, and the precipitate washed with ethyl acetate, whereafter the combined solutions were concentrated in vacuo to about 3 ml. and precipitated by addition of water. The precipitate was recrystallized from methanol and thereafter from acetone/hexane, whereby the desired substance was obtained with M.P. 211–214° C.

EXAMPLE 16

6α - trifluoromethyl-Δ$^{1,4}$-pregnadiene-17α-ol-3,20-dione 17-acetate.—A solution of 440 mg. of 6α-trifluoromethyl-17α-acetoxyprogesterone prepared as described in Example 3 and 300 mg. of 2,3-dichloro-5,6-dicyano-benzoquinone in 15 ml. of benzene was boiled with reflux for 5 hours. After cooling a precipitate was filtered off, and the filtrate was washed with an aqueous solution of sodium bicarbonate and subsequently with water. The dried filtrate was chromatographed on a column of silica gel, whereafter the column was eluated with a mixture of 9 volumes of benzene and 1 volume of ether. By combining the fractions containing the desired substance and evaporating the solution to dryness in vacuo, 265 mg. of crude product were obtained. By recrystallization of the same from acetone/hexane, a product was obtained with M.P. 212–214° C.

EXAMPLES 17–23

Following the procedure described in the foregoing Examples 14 and 15 and using the below mentioned starting materials, the reaction products shown in the following table were obtained:

| Example | Starting material | Reaction Product |
|---|---|---|
| 17 | 6α-Trifluoromethyl-testosterone 17-acetate | 6α-Trifluoromethyl-Δ$^{1,4}$-androstadiene-17β-ol-3-one acetate. |
| 18 | 6α-Trifluoromethyl-17α-methyltestosterone | 6α-Trifluoromethyl-17α-methyl-Δ$^{1,4}$-androstadiene-17β-ol-3-one. |
| 19 | 6α-Trifluoromethyl-Δ⁴-androstene-3,17-dione | 6α-Trifluoromethyl-Δ$^{1,4}$-androstadiene-3,17-dione. |
| 20 | 6α-Trifluoromethyl-cortisone-21-acetate | 6α-Trifluoromethyl-prednisone-21-acetate. |
| 21 | 6α-Trifluoromethyl-9α-fluorocortisone 21-acetate. | 6α-Trifluoromethyl-9α-fluoro-prednisone 21-acetate. |
| 22 | 6α-Trifluoromethyl-progesterone | 6α-Trifluoromethyl-Δ$^{1,4}$-pregnadiene-3,20-dione. |
| 23 | 6α-Trifluoromethyl-19-nor-testosterone 17-acetate. | 6α-Trifluoromethyl-Δ$^{1,4}$-19-nor-androstadiene-17β-ol-3-one acetate. |

ANALYSES

| Examples | C | | H | | F | |
|---|---|---|---|---|---|---|
| | Calc. | Found | Calc. | Found | Calc. | Found |
| 17 | 66.6 | 66.76 | 6.86 | 6.79 | 14.38 | 14.44 |
| 18 | 68.5 | 68.36 | 7.4 | 7.48 | 15.5 | 15.27 |
| 19 | 68.2 | 68.11 | 6.59 | 6.64 | 16.2 | 16.41 |
| 20 | 61.6 | 61.49 | 5.77 | 5.82 | 12.2 | 12.06 |
| 21 | 59.2 | 59.16 | 5.38 | 5.32 | 15.65 | 15.58 |
| 22 | 69.5 | 69.52 | 7.15 | 7.04 | 15.0 | 15.21 |
| 23 | 66.0 | 66.10 | 6.60 | 6.48 | 14.9 | 15.06 |

EXAMPLE 24

(a) *6-trifluoromethyl-17α-acetoxyprogesterone-3-cycloethylene-ketal.*—A mixture of 1.0 g. of 6α-trifluoromethyl-17α-acetoxyprogesterone prepared as described in Example 3, 45 mg. of p-toluenesulfonic acid and 20 ml. of 2-methyl-2-ethyl-1,3-dioxolane was heated for 5 hours, and the 2-butanone liberated during the reaction was slowly distilled through a Vigreux column at atmospheric pressure in mixture with dioxolane. The cooled reaction mixture was diluted with ether, and the solution was washed with a solution of sodium bicarbonate and thereafter with water, and finally dried over $MgSO_4$. The solvent was distilled off in vacuo, and the residue crystallized from methanol containing 0.5% pyridine, whereby 0.75 g. of the desired substance was obtained with a M.P. of 172–175° C. After recrystallization from the same solvent, the M.P. was 178–182° C.

Calculated: C, 64.45%; H, 7.28%. Found: C, 64.28%; H, 7.29%.

(b) *6 - trifluoromethyl - $\Delta^{4,6}$ - pregnadiene-17α-ol-3,20-dione-17-acetate.*—A mixture of 727 mg. of 6-trifluoromethyl - 17α - acetoxy-progesterone-3-cycloethylene ketal, 300 mg. of N-bromosuccinimide and 30 ml. of tetrachloromethane was boiled with reflux for 10 minutes while irradiating with light from a 250 watt photo lamp (Philips type 13103 E/99). After cooling, the succinimide was removed by filtration, and the filtrate was evaporated to dryness in vacuo. The residue was dissolved in 10 ml. of boiling γ-collidine, and the resulting solution was boiled with reflux for 30 minutes. After cooling, the collidine hydrobromide which had been formed during the reaction was filtered off, whereupon the filtrate was diluted with 30 ml. of ether, washed with diluted hydrochloric acid and subsequently with water, and dried over $MgSO_4$. The solvent was distilled off in vacuo, the residue was dissolved in a mixture of 9 ml. of methanol and 1 ml. of 4 N sulphuric acid, and the solution was boiled with reflux for 30 minutes. After cooling, the desired product was precipitated by addition of water. By recrystallization from acetone/hexane the desired substance was obtained with M.P. 231–233° C. The ultra-violet spectrum showed a maximum at 270 m$\mu$ ($\epsilon$=20000).

Calculated: C, 65.73%; H, 6.67%. Found: C, 65.50%; H, 6.76%.

EXAMPLE 25

*6 - trifluoromethyl-$\Delta^{1,4,6}$-pregnatriene-17α-ol-3,20-dione 17-acetate.*—150 mg. of selenium dioxide were added to a solution of 300 mg. of 6-trifluoromethyl-$\Delta^{4,6}$-pregnadiene-17α-ol-3,20-dione 17-acetate in 10 ml. of tertiary butanol containing 0.04 ml. of pyridine. The mixture was boiled with reflux for 24 hours and subsequently cooled and filtered through Hyflo Super-cel to remove selenium solids. The filtrate was evaporated to dryness, and the residue was triturated with water.

After filtering and drying over $P_2O_5$ the product was chromatographed on a column of silica gel to yield 170 mg. of the desired substance.

Calculated: C, 66.0%; H, 6.2%; F, 13.1%. Found: C, 65.92%; H, 6.31%; F, 13.24%.

EXAMPLES 26–33

Following the procedure described in the foregoing Examples 24 and 25, and using the starting materials mentioned in the following table, the reaction products shown in the last column of the table were obtained:

| Example | Starting material | Reaction product |
|---|---|---|
| 26 | 6α-Trifluoromethyl-testosterone 3-ethyleneketal-17-acetate. | 6-Trifluoromethyl-$\Delta^{4,6}$-androstadiene-17β-ol-3-one 17-acetate. |
| 27 | 6α-Trifluoromethyl-17α-methyltestosterone-3-ethyleneketal. | 6.Trifluoromethyl-17α-methyl-$\Delta^{4,6}$-androstadiene-17β-ol-3-one. |
| 28 | 6α-Trifluoromethyl-$\Delta^4$-androstene-3,17-dione-diethyleneketal. | 6-Trifluoromethyl-$\Delta^{4,6}$-androstadiene-3,17-dione. |
| 29 | 6α-Trifluoromethyl-progesterone-3,20-diethyleneketal. | 6-Trifluoromethyl-$\Delta^{4,6}$-pregnadiene-3,20-dione. |
| 30 | 6α-Trifluoromethyl-19-nor-testosterone-3-ethyleneketal 17-acetate. | 6-Trifluoromethyl-$\Delta^{4,6}$-19-nor-androstadiene-17β-ol-3-one 17-acetate. |
| 31 | 6-Trifluoromethyl-$\Delta^{4,6}$-androstadiene-17β-ol-3-one 17-acetate. | 6-Trifluoromethyl-$\Delta^{1,4,6}$-androstatriene-17β-ol-3-one 17-acetate. |
| 32 | 6-Trifluoromethyl-$\Delta^{4,6}$-pregnadiene-3,20-dione. | 6-Trifluoromethyl-$\Delta^{1,4,6}$-pregnatriene-3,20-dione. |
| 33 | 6-Trifluoromethyl-$\Delta^{4,6}$-19-norandrostadiene-17β-ol-3-one 17-acetate. | 6-Trifluoromethyl-$\Delta^{1,4,6}$-19-nor-androstatriene-17β-ol-3-one 17-acetate. |

*Analyses:*

| Example | C | | H | | F | |
|---|---|---|---|---|---|---|
| | Calc. | Found | Calc. | Found | Calc. | Found |
| 26 | 66.6 | 66.47 | 6.86 | 7.02 | 14.38 | 14.20 |
| 27 | 68.5 | 68.59 | 7.4 | 7.45 | 15.5 | 15.32 |
| 28 | 68.2 | 68.31 | 6.59 | 6.51 | 16.2 | 16.25 |
| 29 | 69.5 | 69.38 | 7.15 | 7.02 | 15.0 | 15.20 |
| 30 | 66.0 | 66.04 | 6.60 | 6.56 | 14.9 | 14.73 |
| 31 | 67.0 | 67.11 | 6.4 | 6.40 | 14.5 | 14.57 |
| 32 | 69.8 | 69.88 | 6.6 | 6.53 | 15.1 | 14.96 |
| 33 | 66.3 | 66.18 | 6.1 | 6.23 | 15.0 | 14.81 |

What I claim is:

1. A process for the production of 3-keto-$\Delta^4$-6α-trifluoromethyl steroids, which comprises the steps of reacting the corresponding 3-keto-$\Delta^4$ steroid compound, in which the 3-keto group has been transformed into a group selected from the class consisting of 3-enol ether and 3-cycloketal groups, with trifluoroiodomethane in the presence of an organic base, while accelerating the reaction with an initiator and subjecting the reaction product to an acid hydrolysis.

2. The process of claim 1, wherein the initiator is peroxide.

3. The process of claim 1, wherein the reaction mixture is irradiated with ultraviolet light.

4. A compound of the class consisting of the 3-enol ethers of 3-keto-$\Delta^4$-6α-trifluoromethyl steroids of the formula:

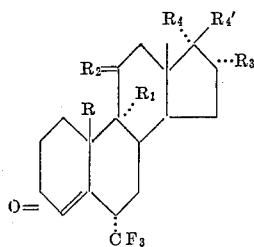

in which formula R is selected from the class consisting of hydrogen and methyl; $R_1$ is selected from the class consisting of hydrogen, fluorine and chlorine; $R_2$ is selected from the class consisting of $$HO \atop H \quad \text{and} \quad =O$$

$R_3$ is selected from the class consisting of hydrogen, hydroxy and the acyloxy radical of a carboxylic acid having not more than 10 carbon atoms, methyl, fluorine and chlorine; $R_4$ and $R_4'$ together is keto and individually $R_4$ is selected from the class consisting of hydrogen, hydroxy, and the acyloxy radical of a carboxylic acid having not more than 10 carbon atoms, methyl, ethinyl and propenyl; and $R_4'$ is selected from the class consisting of hydroxy and the acyloxy radical of a carboxylic acid having not more than 10 carbon atoms, and a group of the following formula: $-CR_2-CH_2R_5$, in which $R_2$ is as defined above and $R_5$ is selected from the class consisting of hydrogen, hydroxy and the acyloxy radical of a carboxylic acid having not more than 10 carbon atoms, fluorine and chlorine.

5. $6\alpha$ - trifluoromethyl-$17\alpha$-acetoxyprogesterone-3-enol ethyl ether.

6. A process for the production of 3-keto-$\Delta^{1,4}$-$6\alpha$-trifluoromethyl steroids which comprises the steps of reacting a 3-enol ether of a 3-keto-$\Delta^4$ steroid with trifluoroiodomethane in the presence of an organic base, while irridiating the reaction mixture with ultraviolet light, thereafter treating the obtained 3-enol ether of the 3-keto-$\Delta^4$-$6\alpha$-trifluoromethyl steroid with N-bromosuccinimide in aqueous buffered acetone, treating the resulting bromo-compound with a dehydrobrominating agent and isolating the 3-keto-$\Delta^{1,4}$-$6\alpha$-trifluoromethyl steroid thereby obtained.

No references cited.

LEWIS GOTTS, *Primary Examiner.*